(12) United States Patent
Cosby et al.

(10) Patent No.: US 9,417,258 B2
(45) Date of Patent: Aug. 16, 2016

(54) SENSOR AND TOOTH ARRANGEMENT FOR SHAFT SPEED DETECTION

(75) Inventors: James Cosby, Glastonbury, CT (US); Peter V. Tomeo, Middletown, CT (US); Angel L. Santiago, Norwich, CT (US); Heriberto Rodriguez, Manchester, CT (US); Carney R. Anderson, East Haddam, CT (US)

(73) Assignee: United Technologies Corporation, Hartford, CT (US)

( * ) Notice: Subject to any disclaimer, the term of this patent is extended or adjusted under 35 U.S.C. 154(b) by 776 days.

(21) Appl. No.: 13/607,986

(22) Filed: Sep. 10, 2012

(65) Prior Publication Data

US 2014/0070794 A1    Mar. 13, 2014

(51) Int. Cl.
| | |
|---|---|
| *G01B 7/30* | (2006.01) |
| *G01P 3/488* | (2006.01) |
| *F01D 21/00* | (2006.01) |

(52) U.S. Cl.
CPC .............. *G01P 3/488* (2013.01); *F01D 21/003* (2013.01); *F05D 2270/80* (2013.01); *Y10T 74/19949* (2015.01)

(58) Field of Classification Search
CPC ...................................................... G01P 3/481
USPC ............................... 324/173, 207.15, 207.25
See application file for complete search history.

(56) References Cited

U.S. PATENT DOCUMENTS

| | | | | |
|---|---|---|---|---|
| 3,930,201 | A * | 12/1975 | Ackermann et al. | 307/106 |
| 4,700,133 | A * | 10/1987 | Day | 324/207.15 |
| 4,841,243 | A * | 6/1989 | Bishop et al. | 324/174 |
| 5,057,727 | A * | 10/1991 | Jones | 310/68 B |
| 5,068,606 | A * | 11/1991 | Kawate et al. | 324/174 |
| 5,157,966 | A * | 10/1992 | Lugosi et al. | 73/115.02 |
| 5,159,268 | A | 10/1992 | Wu | |
| 5,850,142 | A | 12/1998 | Rountos et al. | |
| 5,977,765 | A * | 11/1999 | Gibson et al. | 324/165 |
| 6,163,148 | A | 12/2000 | Takada et al. | |
| 6,208,131 | B1 * | 3/2001 | Cebis et al. | 324/165 |
| 6,218,026 | B1 * | 4/2001 | Ewing et al. | 428/553 |
| 6,229,299 | B1 | 5/2001 | Strashny | |
| 6,445,995 | B1 | 9/2002 | Mollmann | |
| 6,498,451 | B1 * | 12/2002 | Boules et al. | 318/661 |
| 7,208,939 | B2 | 4/2007 | Frederick et al. | |
| 7,221,150 | B2 * | 5/2007 | Hudson et al. | 324/207.15 |
| 7,285,949 | B2 | 10/2007 | Burns et al. | |
| 2008/0303513 | A1* | 12/2008 | Turner | 324/160 |
| 2009/0189598 | A1* | 7/2009 | Turner et al. | 324/173 |
| 2011/0138816 | A1 | 6/2011 | Takeda et al. | |

(Continued)

FOREIGN PATENT DOCUMENTS

| | | | |
|---|---|---|---|
| EP | 1275953 | A2 * | 1/2003 |
| GB | 2312287 | | 10/1997 |

OTHER PUBLICATIONS

International Search Report and Written Opinion for International Application No. PCT/US2013/058656 completed on Dec. 23, 2013.

(Continued)

*Primary Examiner* — Bot Ledynh

(74) *Attorney, Agent, or Firm* — Carlson, Gaskey & Olds, P.C.

(57) ABSTRACT

A non-ferrous shaft includes multiple non-integral ferrous tooth components, thereby allowing a sensor to detect the shaft speed.

11 Claims, 2 Drawing Sheets

(56) References Cited

U.S. PATENT DOCUMENTS

| | | |
|---|---|---|
| 2011/0144883 A1 | 6/2011 | Rollinger et al. |
| 2011/0308331 A1 | 12/2011 | Bodin |
| 2012/0107094 A1 | 5/2012 | Lillis |
| 2012/0293115 A1* | 11/2012 | Ramsesh ............ 320/108 |

OTHER PUBLICATIONS

International Preliminary Report on Patentability for International Application No. PCT/US2013/058656 mailed Mar. 19, 2015.

* cited by examiner

SENSOR AND TOOTH ARRANGEMENT FOR SHAFT SPEED DETECTION

TECHNICAL FIELD

The present disclosure relates generally to turbine engine shafts, and more particularly to a sensor arrangement for detecting a rotational speed of a shaft.

BACKGROUND OF THE INVENTION

Fan based turbine engines, such as those utilized on commercial aircraft, include a fan/compressor connected to turbine sections of the turbine engine via a low shaft. The turbine sections cause the low shaft to rotate, which in turn causes the fan/compressor to rotate and draws air into the fan based turbine engine. In order to control the speed of the fan/compressor, and thereby control airflow through the turbine engine, a magnetic fan shaft speed sensor is utilized in conjunction with a controller. The magnetic low shaft speed sensor monitors the rotational speed of the low shaft and the controller makes corresponding adjustments to control the low shaft speed based on the monitored speed.

In a typical arrangement, the low shaft includes multiple sensor teeth that extend radially out from the low shaft. The teeth are arranged circumferentially around the main shaft body. The teeth and the shaft are an integral monolithic component. A magnetic sensor is located adjacent to the shaft, aligned with the sensor teeth, and detects each sensor tooth as the sensor tooth rotates through the magnetic field generated by the magnetic sensor. The sensor is preloaded with the number of sensor teeth on the shaft and determines that one full rotation of the shaft has occurred when the preloaded number of sensor teeth has been detected. Using this arrangement, the speed of the shaft can be determined by the magnetic shaft speed sensor according to conventional techniques.

Due to the inherent sensing capabilities of the magnetic shaft speed sensor, the shaft in this arrangement is required to be constructed of a ferrous material, such as steel, or the magnetic sensor will be unable to detect the teeth. A steel shaft is inherently heavier that alternate, non-ferrous, shaft materials, such as titanium alloy.

SUMMARY OF THE INVENTION

A turbine engine according to an exemplary embodiment of this disclosure, among other possible things includes a non-ferrous shaft, a plurality of ferrous tooth components arranged circumferentially about the shaft, and a sensor operable to detect each of the plurality of ferrous tooth components rotating past the sensor and thereby detect a rotational speed of said shaft.

In a further embodiment of the foregoing turbine engine, each of the plurality of ferrous tooth components comprises, a base portion contacting an inner diameter surface of the shaft, a load bearing portion extending radially outward from the base portion relative to an axis defined by the shaft, a tooth portion extending radially outward from the load bearing portion relative to the axis defined by the shaft.

In a further embodiment of the foregoing turbine engine, each of the base portions is connected to shaft via a plurality of fasteners.

In a further embodiment of the foregoing turbine engine, each of the load bearing portions extends into a solid portion of the shaft such that an outer diameter surface of the load bearing portion is approximately flush with an outer diameter surface of the shaft.

In a further embodiment of the foregoing turbine engine, each of the load bearing portions is shaped to fit in a corresponding shaft slot.

In a further embodiment of the foregoing turbine engine, each of the tooth portions extends radially outward from the load bearing portion such that the tooth portion is at least partially exterior to the shaft.

In a further embodiment of the foregoing turbine engine, each of the tooth portions is entirely exterior to the shaft.

In a further embodiment of the foregoing turbine engine, the tooth portion is angled relative to the shaft axis such that tooth portion is vertical relative to the sensor.

In a further embodiment of the foregoing turbine engine, the sensor is a magnetic shaft speed sensor.

In a further embodiment of the foregoing turbine engine, each of the plurality of ferrous tooth components is at least partially constructed of steel.

In a further embodiment of the foregoing turbine engine, the non-ferrous shaft is constructed of a material selected from the list of nickel, titanium, and aluminum.

In a further embodiment of the foregoing turbine engine, the plurality of ferrous tooth components comprise at least two groups of tooth components and wherein the first group of tooth components has a first degree of magnetism and the second group of tooth components has a second degree of magnetism distinguishable from the first degree of magnetism.

A ferrous tooth component for a shaft according to an exemplary embodiment of this disclosure, among other possible things includes a base portion, a load bearing portion extending outward from the base portion, and a tooth portion extending outward from the load bearing portion.

In a further embodiment of the ferrous tooth, the base portion comprises a curved contact surface, wherein a contour of the curved contact surface is such that the curved contact surface is flush with an inner diameter of a shaft in an installed position.

In a further embodiment of the ferrous tooth, the base portion comprises a plurality of fastener holes.

In a further embodiment of the ferrous tooth, the load bearing portion extends from the base portion such that an outer diameter surface of the load bearing portion is approximately flush with an outer diameter surface of a shaft when the ferrous tooth is in an installed position.

In a further embodiment of the ferrous tooth, each of the load bearing portions is shaped to fit in a corresponding shaft slot.

In a further embodiment of the ferrous tooth, each of the load bearing portions is keyed.

In a further embodiment of the ferrous tooth, each of the tooth portions extends radially outward from the load bearing portion such that the tooth portion is at least partially exterior to a shaft in an installed position.

In a further embodiment of the ferrous tooth, the tooth portion is angled relative to the contact surface.

DETAILED DESCRIPTION

Figure 1:
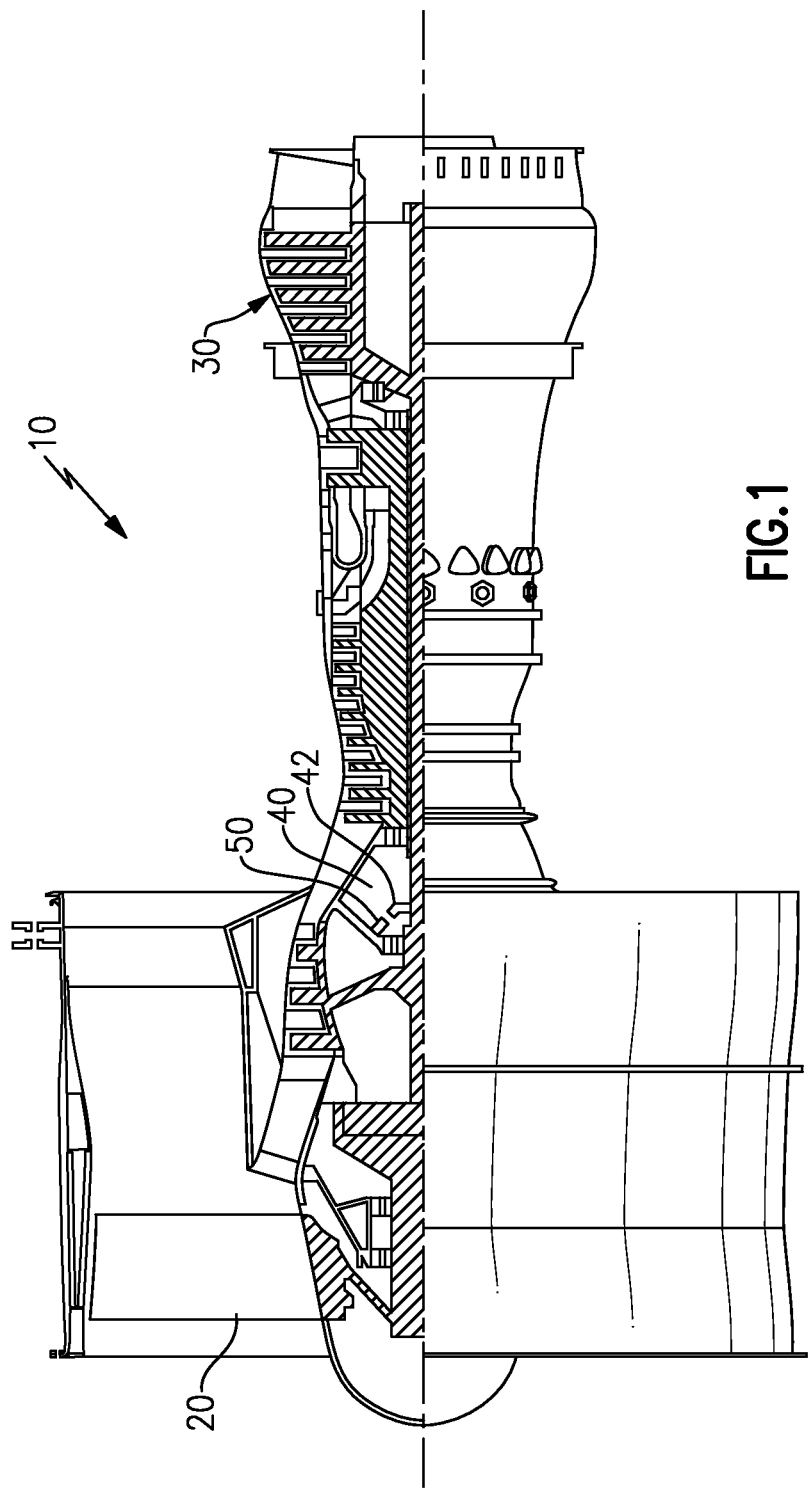
FIG. 1 illustrates a highly schematic fan based turbine engine.

FIG. 1 illustrates a highly schematic fan based turbine engine 10. The turbine engine 10 includes a fan/compressor 20, connected to a turbine section 30 of the turbine engine 10 via a low shaft 40. The turbine engine 10 includes a magnetic shaft speed sensor 50. Multiple tooth components 42 are arranged circumferentially about the shaft 40 adjacent to the shaft speed sensor 50. As the shaft 40 rotates, the tooth components 42 rotate through a magnetic field output by the magnetic shaft speed sensor 50. Each of the tooth components 42 is ferrous and interacts with the field emitted by the magnetic shaft speed sensor 50. The magnetic shaft speed sensor 50 detects this interactivity, and thereby detects the tooth component 42 passing the sensor 50. Once a predetermined number of tooth components 42 are detected, the speed sensor determines that a full rotation of the shaft 40 has occurred, and the rotational speed of the shaft 40 is determined based on the time elapsed during a full rotation. In one example multiple types of tooth components 42 are used, with each type having a different degree of magnetism. The example arrangement allows for a once per revolution signal to be detected, or enables a specific clocking orientation of the rotor.

The low shaft 40 is constructed of a non-ferrous material, such as titanium or titanium alloy, and the tooth components 42 are constructed of a ferrous material such as steel. For the purposes of this disclosure "ferrous" refers to any material that interacts with a magnetic field and "non-ferrous" refers to any material that does not interact with a magnetic field. Utilization of separate, ferrous, tooth components 42 allows a non-ferrous fan shaft 40 to be utilized in conjunction with a magnetic fan shaft sensor 50.

The tooth components 42 are arranged circumferentially around the shaft 40 with each tooth component 42 being approximately equidistant from each adjacent tooth component 42. By evenly spacing the tooth components 42 around the shaft 40, the speed measurements from the magnetic shaft speed sensor 50 can be acquired incrementally, rather than requiring a full rotation of the fan shaft 40. Minor variation in the distance between adjacent tooth components 42 is the result of manufacturing and assembly tolerances. The even circumferential distribution of the tooth components 42, further ensures that the shaft 40 remains balanced during operation.

Figure 2A:
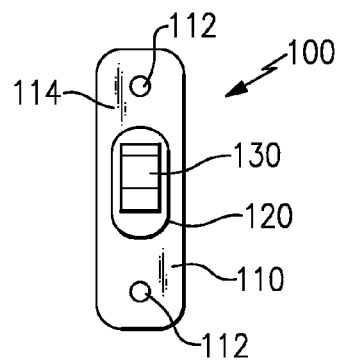
FIG. 2A illustrates a top view of a ferrous tooth component for a non-ferrous fan shaft.
Figure 2B:
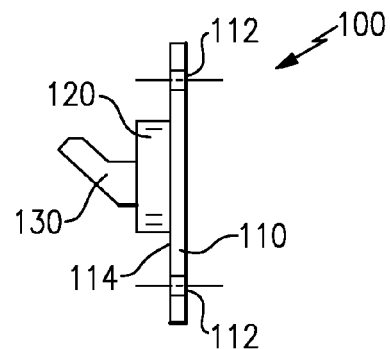
FIG. 2B illustrates a side view of a ferrous tooth component for a non-ferrous fan shaft.
Figure 2C:
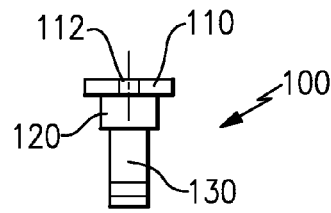
FIG. 2C illustrates a front view of a ferrous tooth component for a non-ferrous fan shaft.

FIGS. 2A, 2B, and 2C illustrate a top view (FIG. 2A), a side view (FIG. 2B) and a front view (FIG. 2C) of a tooth component 100 that can be used in the turbine engine 10 arrangement illustrated in FIG. 1. In the illustrated example, the tooth component 100 includes a base portion 110 with multiple fastener holes 112. The base portion 110 includes a contact surface 114 that contacts an inner diameter surface of the fan shaft 40 (illustrated in FIG. 1) when the tooth component 100 is installed. The illustrated contact surface 114 is a rectangular surface with rounded corners, however, any geometric shape with room for both a load bearing portion and can be utilized for the contact surface 114. Protruding from the contact surface 114 of the base portion 110 is a load bearing portion 120. The load bearing portion 120 has a greater depth (length normal to the contact surface 114 of the base portion 110) than the base portion 110, and is shaped to fit a corresponding slot in the fan shaft 40. In alternate examples the tooth component 100 is connected to the turbine engine 10 using a different connection and fastener holes 112 are not required.

Each of the tooth components 100 also includes a tooth portion 130 that extends from the load bearing portion 120. In an installed configuration, the tooth portion 130 extends radially outward from the shaft beyond an outer diameter surface of the shaft. The tooth portion 130 is angled relative to a line normal to the contact surface 114 of the base portion 110. The particular angle of the tooth portion 130 is based on the location and angle of the corresponding magnetic shaft speed sensor 50 in an installed configuration.

While illustrated as a level planar surface in FIGS. 2A, 2B, and 2C for descriptive effect, in a practical implementation, the contact surface 114 of the base portion 110 is curved to match an interior diameter surface curve of the fan shaft 40. The matching curved surface allows the contact surface 114 of the base portion 110 to be flush with the inner diameter surface of the shaft, thereby minimizing vibrational wear and tear.

Figure 3:
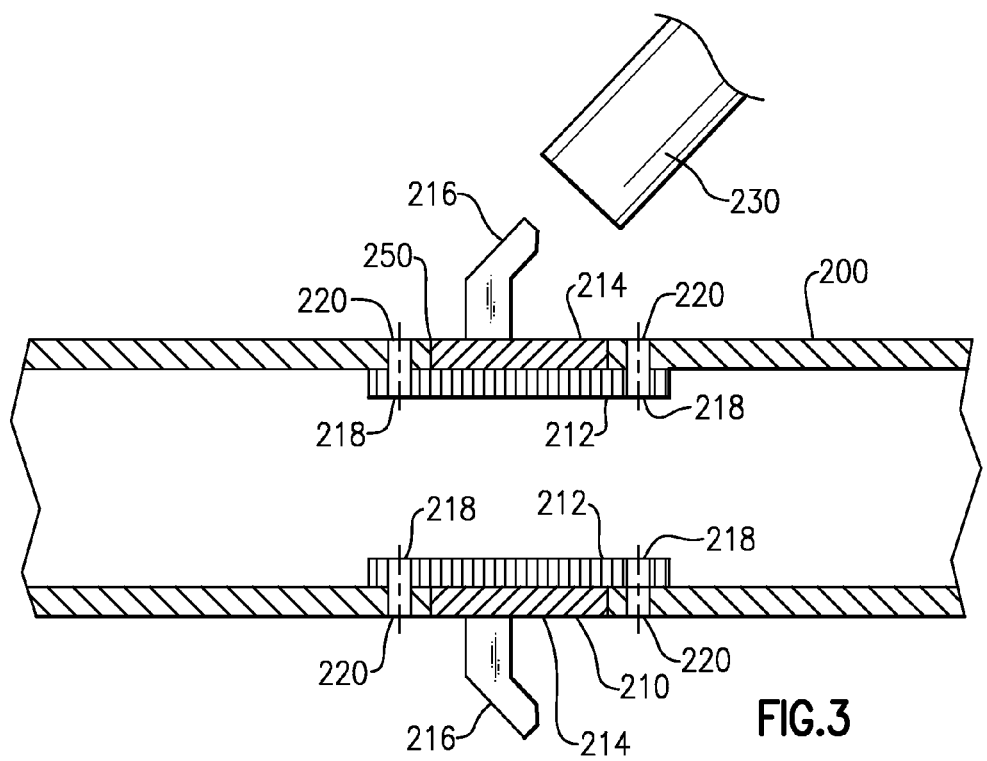
FIG. 3 illustrates a schematic sectional view of a portion of a fan shaft for a fan based turbine engine.

FIG. 3 illustrates a schematic sectional view of a portion of a shaft 200, including multiple tooth components 210 located inside the shaft 200 and extending out of the shaft 200. As described with regards to FIGS. 2A, 2B, and 2C, each of the tooth components 210 has a base portion 212, a load bearing portion 214, and a tooth portion 216. The base portions 212 include fastener holes 218. In the illustrated installed position, the fastener holes 218 in the base portion 212 of each tooth component 210 line up with corresponding fastener holes 220 in the shaft 200. A fastener (not pictured) protrudes through both the fastener hole 218 in the base portion 212 and the corresponding fastener hole 220 in the shaft 200, thereby holding the tooth component 210 in place. In one example, a rivet style fastener is used. Alternately, other known fastener types may be used.

A magnetic speed sensor 230 is positioned adjacent to the shaft 200 and detects each tooth portion 216 as the tooth portion 216 rotates through the magnetic field generated by the magnetic sensor 230. The illustrated magnetic sensor 230 is angled due to turbine engine design constraints. The angle of the tooth portion 216 aligns the ferrous tooth of the tooth component 210 with the magnetic sensor 230 such that the tooth portion 216 appears vertical relative to the magnetic sensor 230. Aligning the ferrous tooth vertically relative to the magnetic sensor 230 optimizes the ability of the magnetic sensor 230 to detect a tooth component 210 rotating through the magnetic field generated by the magnetic sensor 230.

The shaft 200 further includes a slot 250 shaped to fit the load bearing portion 214 of the tooth component 210. When installed, the load bearing portion 214 of the tooth component 210 extends into the shaft 200 in the corresponding slot 250 and supports twisting loads placed on the tooth component 210. By fitting the load bearing portion 214 of the tooth component 210 to the fan shaft slot 250, the rotational forces of the rotating shaft 200 are applied to the load bearing portion 214 and the base portion 212 of the tooth component 210 instead of being applied to the fasteners in the fastener holes 220, 218.

The load placed on the fasteners is further reduced by placing the tooth component 210 inside the shaft 200 rather than on an outer diameter surface of the shaft 200. By placing the tooth component 210 inside the shaft 200, centripetal force pushes the tooth component 210 against the shaft, thereby reducing the load on the fasteners. If, instead, the tooth component 200 were external to the shaft 200, centripetal force would push the tooth component 200 radially away from the shaft, thereby increasing the load on the fasteners.

The illustrated example tooth component 210 load bearing portion 214 extends the full radial length of the shaft 200 and is flush with the outer diameter surface of the fan shaft 200. It is understood, however, that alternate examples can include a load bearing portion 214 that extends only partially into the shaft 200. In such an arrangement, the corresponding shaped fitted slot 250 on the fan shaft 200 is similarly shaped. In one alternate example the shaft slot 250 is a keyed slot, thereby prevented incorrect orientation of the tooth component 210 during assembly.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A turbine engine comprising;
  a non-ferrous shaft;
  a plurality of ferrous tooth components arranged circumferentially about said shaft;
  wherein each of said plurality of ferrous tooth components comprises:
  a base portion contacting an inner diameter surface of said shaft;
  a load bearing portion extending radially outward from said base portion relative to an axis defined by said shaft;
  a tooth portion extending radially outward from said load bearing portion relative to said axis defined by said shaft; and
  a sensor operable to detect each of said plurality of ferrous tooth components rotating past said sensor and thereby detect a rotational speed of said shaft.

2. The turbine engine of claim 1, wherein each of said base portions is connected to shaft via a plurality of fasteners.

3. The turbine engine of claim 1, wherein each of said load bearing portions extends into a solid portion of said shaft such that an outer diameter surface of said load bearing portion is approximately flush with an outer diameter surface of said shaft.

4. The turbine engine of claim 3, wherein each of said load bearing portions is shaped to fit in a corresponding shaft slot.

5. The turbine engine of claim 1, wherein each of said tooth portions extends radially outward from said load bearing portion such that said tooth portion is at least partially exterior to said shaft.

6. The turbine engine of claim 5, wherein each of said tooth portions is entirely exterior to said shaft.

7. The turbine engine of claim 5, wherein said tooth portion is angled relative to said shaft axis such that tooth portion is vertical relative to said sensor.

8. The turbine engine of claim 1, wherein said sensor is a magnetic shaft speed sensor.

9. The turbine engine of claim 1, wherein each of said plurality of ferrous tooth components is at least partially constructed of steel.

10. The turbine engine of claim 1, wherein said non-ferrous shaft is constructed of a material selected from the list of nickel, titanium, and aluminum.

11. The turbine engine of claim 1, wherein said plurality of ferrous tooth components comprise at least two groups of tooth components and wherein said first group of tooth components has a first degree of magnetism and said second group of tooth components has a second degree of magnetism distinguishable from said first degree of magnetism.

\* \* \* \* \*